US011299036B2

(12) United States Patent
Beckner et al.

(10) Patent No.: US 11,299,036 B2
(45) Date of Patent: Apr. 12, 2022

(54) HYDROGEN STORAGE TANK HAVING A NANOPOROUS BREATHER LAYER

(71) Applicant: GM GLOBAL TECHNOLOGY OPERATIONS LLC, Detroit, MI (US)

(72) Inventors: Matthew Beckner, Holly, MI (US); James R. Salvador, East Lansing, MI (US); Anne M. Dailly, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 140 days.

(21) Appl. No.: 16/676,204

(22) Filed: Nov. 6, 2019

(65) Prior Publication Data

US 2021/0129662 A1    May 6, 2021

(51) Int. Cl.
*B60K 15/03* (2006.01)
*F17C 13/00* (2006.01)
(Continued)

(52) U.S. Cl.
CPC .......... *B60K 15/035* (2013.01); *F17C 13/002* (2013.01); *B60K 2015/03315* (2013.01);
(Continued)

(58) Field of Classification Search
CPC .......... F17C 13/002; F17C 13/00; F17C 1/06; F17C 1/04; F17C 1/02; B60K 15/035; B60K 15/077
(Continued)

(56) References Cited

U.S. PATENT DOCUMENTS 3,140,006 A * 7/1964 Nelson ............... F17C 1/04
220/587
4,699,288 A * 10/1987 Mohan ............ B29C 53/602
220/560.01
(Continued)

FOREIGN PATENT DOCUMENTS

CA      2764698 A1 * 12/2010  .............. F17C 1/16
CN      1529083 A      9/2004
(Continued)

OTHER PUBLICATIONS

First Office Action for Chinese Patent Application No. 202011229827.1 dated Jan. 25, 2022, with correspondence dated Jan. 27, 2022, from China Patent Agent (H.K.) Ltd summarizing contents; 6 pages.

*Primary Examiner* — Robert J Hicks
(74) *Attorney, Agent, or Firm* — Harness, Dickey & Pierce, P.L.C.

(57) ABSTRACT

A storage tank for a gas is provided. The storage tank includes a liner defining an internal compartment; a boss coupled to the liner; an interlayer covering a portion of the boss and the liner, the interlayer being non-pyrolyzed and including an interconnected web and pores having a diameter greater than the diameter of a hydrogen molecule and less than or equal to about 2 nm; and an outer shell including a carbon fiber reinforced composite, the outer shell covering the interlayer, except for an interlayer end that is in contact with the boss, so that the interlayer end defines an interlayer ring that is exposed to an external environment. The storage tank is configured so that when gas diffuses through the liner to the interlayer, the interlayer channels the gas out of the exposed interlayer ring. Methods of fabricating the storage tank are also provided.

20 Claims, 4 Drawing Sheets

(51) Int. Cl.
*B60K 15/035* (2006.01)
*B60K 15/077* (2006.01)

(52) U.S. Cl.
CPC ............... *B60K 2015/0777* (2013.01); *F17C 2203/0604* (2013.01)

(58) Field of Classification Search
USPC .................. 220/589, 588, 586, 581; 206/0.6
See application file for complete search history.

(56) References Cited

U.S. PATENT DOCUMENTS

| | | | | |
|---|---|---|---|---|
| 5,499,739 | A * | 3/1996 | Greist, III | B29C 53/602 |
| | | | | 138/30 |
| 6,186,356 | B1 * | 2/2001 | Berkley | F17C 1/00 |
| | | | | 220/304 |
| 6,554,939 | B1 * | 4/2003 | Murphy | B29C 53/602 |
| | | | | 156/173 |
| 7,195,133 | B1 * | 3/2007 | Cundiff | F17C 1/04 |
| | | | | 220/589 |
| 7,870,971 | B2 | 1/2011 | Schlag | |
| 8,550,286 | B2 * | 10/2013 | Lukiyanets | F17C 1/06 |
| | | | | 220/589 |
| 8,906,287 | B2 | 12/2014 | Hatta | |
| 9,618,160 | B2 | 4/2017 | Eihusen et al. | |
| 10,794,535 | B2 | 10/2020 | Ogiwara et al. | |
| 2009/0236349 | A1 * | 9/2009 | Mueller | F17C 1/06 |
| | | | | 220/590 |
| 2010/0314396 | A1 * | 12/2010 | Zieger | F17C 1/06 |
| | | | | 220/581 |
| 2015/0274006 | A1 * | 10/2015 | Chung | F17C 1/06 |
| | | | | 220/586 |
| 2017/0297259 | A1 * | 10/2017 | Otsubo | F17C 1/06 |
| 2018/0172207 | A1 * | 6/2018 | Uehara | F17C 13/00 |
| 2019/0338886 | A1 * | 11/2019 | Santos | F25D 3/12 |
| 2020/0132253 | A1 | 4/2020 | Beckner et al. | |
| 2021/0010640 | A1 | 1/2021 | Beckner | |

FOREIGN PATENT DOCUMENTS

| | | |
|---|---|---|
| CN | 104948902 A | 9/2015 |
| CN | 108626565 A | 10/2018 |
| CN | 112780941 A | 5/2021 |
| DE | 102020126886 A1 | 5/2021 |
| JP | 2011106514 A | 6/2011 |
| JP | 2017194150 A | 10/2017 |

* cited by examiner

HYDROGEN STORAGE TANK HAVING A NANOPOROUS BREATHER LAYER

INTRODUCTION

This section provides background information related to the present disclosure which is not necessarily prior art.

Hydrogen-powered vehicles generate mechanical energy from hydrogen gas by either burning hydrogen gas in an internal combustion engine or by reacting hydrogen gas with oxygen in a hydrogen-fuel cell that runs an electric motor. Whether the hydrogen-powered vehicle generates energy by combustion or with a fuel cell, the hydrogen gas must be stored in a storage tank.

Type IV storage tanks for hydrogen gas include an interior polymeric liner that defines an internal storage compartment and an exterior shell. When a storage tank is full, high internal pressure provided from the hydrogen gas presses the liner outward toward the outer shell, such that the pressure pushes the liner against the outer shell. However, when the pressure decreases due to defueling, and because hydrogen gas molecules ($H_2$) are very small—having a diameter of about 2.5 Å (0.25 nm), hydrogen molecules can diffuse through the liner and get trapped between the liner and the outer shell. As greater quantities of hydrogen gas diffuse through the liner, a space filled with hydrogen gas develops between the liner and the outer shell, which causes a portion of the liner adjacent to the space to buckle and bow inward. Therefore, modified type IV storage tanks that prevent or minimize bowing that results from the formation of gas pockets between a liner and an outer shell are desirable.

SUMMARY

This section provides a general summary of the disclosure, and is not a comprehensive disclosure of its full scope or all of its features.

In various aspects, the current technology provides a storage tank for a gas, the storage tank including a liner having a first end portion, a central body portion, and a second end portion that opposes the first end portion, the liner defining an interior compartment; a boss coupled to the first end portion of the liner; an interlayer disposed about the liner and the boss, such that the interlayer extends from a first interlayer end at an exposed outer surface of the boss, about the central body portion of the liner, and about at least a portion of the second end portion of the liner to a second interlayer end that opposes the first interlayer end; and an outer shell covering substantially all of the interlayer, except for the first interlayer end and optionally the second interlayer end, so that the first interlayer end and optionally the second interlayer end are exposed to an external environment, wherein the storage tank is configured so that when gas diffuses through the liner to the interlayer, the interlayer channels the gas out of the first interlayer end of the interlayer to the external environment.

In one aspect, the liner includes a polymer having a density that is greater than or equal to about 900 kg/m³ to less than or equal to about 1200 kg/m³.

In one aspect, the polymer includes a polyamide, polyethylene, ethylene vinyl alcohol, polytetrafluoroethylene, or combinations thereof.

In one aspect, the interlayer has an interconnected web including pores having an average diameter of greater than or equal to about 500 pm to less than or equal to about 2 nm and a porosity of greater than or equal to about 15% to less than or equal to about 85%.

In one aspect, the interconnected web has an interlayer material including carbon, silica, a polymer, a metal-organic framework, or combinations thereof.

In one aspect, the interconnected web further includes a binder.

In one aspect, the binder includes styrene-butadiene rubber, cellulose, polyvinylpyrrolidone, polyvinylidene fluoride, perfluorobutylethylene, perfluorobutyl vinyl ether, trifluoroethylene, hexafluoropropene, hexafluoroisobutylene, pentafluoropropene, polyvinyl alcohol with sulfosuccinic acid, polytetrafluoroethylene, polystyrene polyethylene oxide, a polyamide, polypropylene carbonate, polyethylene carbonate, poly(cyclohexene propylene) carbonate, butylene carbonate, or combinations thereof.

In one aspect, the outer shell includes a carbon fiber reinforced composite.

In one aspect, the first interlayer end that is exposed to the external environment defines an interlayer ring disposed about the boss, the interlayer ring having a thickness that is greater than or equal to about 0.1 mm to less than or equal to about 2 mm.

In one aspect, the storage tank further includes a second boss coupled to the second end portion of the liner, wherein the interlayer extends to the second interlayer end at an exposed outer surface of the second boss and the outer shell does not cover the second interlayer end so that the second interlayer end is exposed to the external environment, wherein the storage tank is configured so that when gas diffuses through the liner to the interlayer, the interlayer channels the gas out of at least one of the first interlayer end or the second interlayer end of the interlayer to the external environment.

In various aspects, the current technology also provides a storage tank for a gas, the storage tank including a liner having a polymer and defining an internal compartment; a boss coupled to the liner; an interlayer covering a portion of the boss and the liner, the interlayer including an interconnected web including carbon, silica, a polymer, a metal organic framework, or combinations thereof and pores having a diameter greater than the diameter of a hydrogen molecule and less than or equal to about 2 nm, and the interlayer being non-pyrolyzed; and an outer shell including a carbon fiber reinforced composite, the outer shell covering the interlayer, except for an interlayer end that is in contact with the boss, so that the interlayer end of the interlayer defines an interlayer ring that is exposed to an external environment, wherein the storage tank is configured so that when gas diffuses through the liner to the interlayer, the interlayer channels the gas out of the exposed interlayer ring.

In one aspect, the interconnected web of the interlayer has a porosity of greater than or equal to about 15% to less than or equal to about 85%

In one aspect, the interlayer further includes a binder selected from the group including styrene-butadiene rubber, cellulose, polyvinylpyrrolidone, polyvinylidene fluoride, polypropylene carbonate, polyethylene carbonate, poly(cyclohexene propylene) carbonate, butylene carbonate, and combinations thereof.

In various aspects, the current technology further provides a method of fabricating a storage tank for a gas, the method including coupling a boss to a liner that defines an internal compartment; applying an interlayer over the liner and over a portion of the boss, the interlayer having an interconnected web including pores having a diameter greater than the size of a hydrogen molecule and less than or equal to about 2 nm and a binder; and forming an outer shell on the interlayer, except for an interlayer end that is in contact with the boss, so that the interlayer end defines a interlayer ring that is exposed to an external environment, wherein the storage tank is configured so that when gas diffuses through the liner to the interlayer, the interlayer channels the gas out of the exposed interlayer ring.

In one aspect, the coupling the boss to the liner includes screwing the boss into the liner by way of threading on an inner surface of the boss and complementary threading on an outer surface of the liner.

In one aspect, the interlayer is formed by forming a mixture having a precursor powder and the binder, casting a layer of the mixture onto a substrate, drying the layer to form the interlayer, and optionally calendaring the interlayer.

In one aspect, the mixture includes the precursor powder at a concentration of greater than or equal to about 70 wt. % to less than or equal to about 95 wt. % and the binder at a concentration of greater than or equal to about 5 wt. % to less than or equal to about 30 wt. %.

In one aspect, the precursor powder includes carbon, silica, a polymer, a metal-organic framework, or combinations thereof and the binder includes styrene-butadiene rubber, cellulose, polyvinylpyrrolidone, polyvinylidene fluoride, polypropylene carbonate, polyethylene carbonate, poly(cyclohexene propylene) carbonate, butylene carbonate, or combinations thereof.

In one aspect, the method further includes applying an adhesive to the liner and to the portion of the boss prior to the applying the green interlayer.

In one aspect, the interlayer has an adjunct binder and is in a green form, and the method further includes, after the forming, heating the storage tank at a temperature greater than or equal to about 90° C. to less than or equal to about 160° C. to remove at least a portion of the adjunct binder from the interlayer in green form to convert the interlayer in green form to a porous interlayer having a relatively higher porosity than the interlayer in green form.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of" the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current technology provides a modified type IV storage tank, referred to herein as simply a "storage tank" or a "storage tank for a gas," that includes an interlayer, also referred to herein as a "breather layer," between a liner and an outer shell. The interlayer receives hydrogen ($H_2$) molecules that diffuse through the liner and channels them to an environment that is external to the storage tank. By removing $H_2$ molecules that diffuse through the liner from the tank, buckling and bowing of the liner is prevented or minimized. Methods of fabricating the storage tank are also provided by the current technology.

Figure 1:
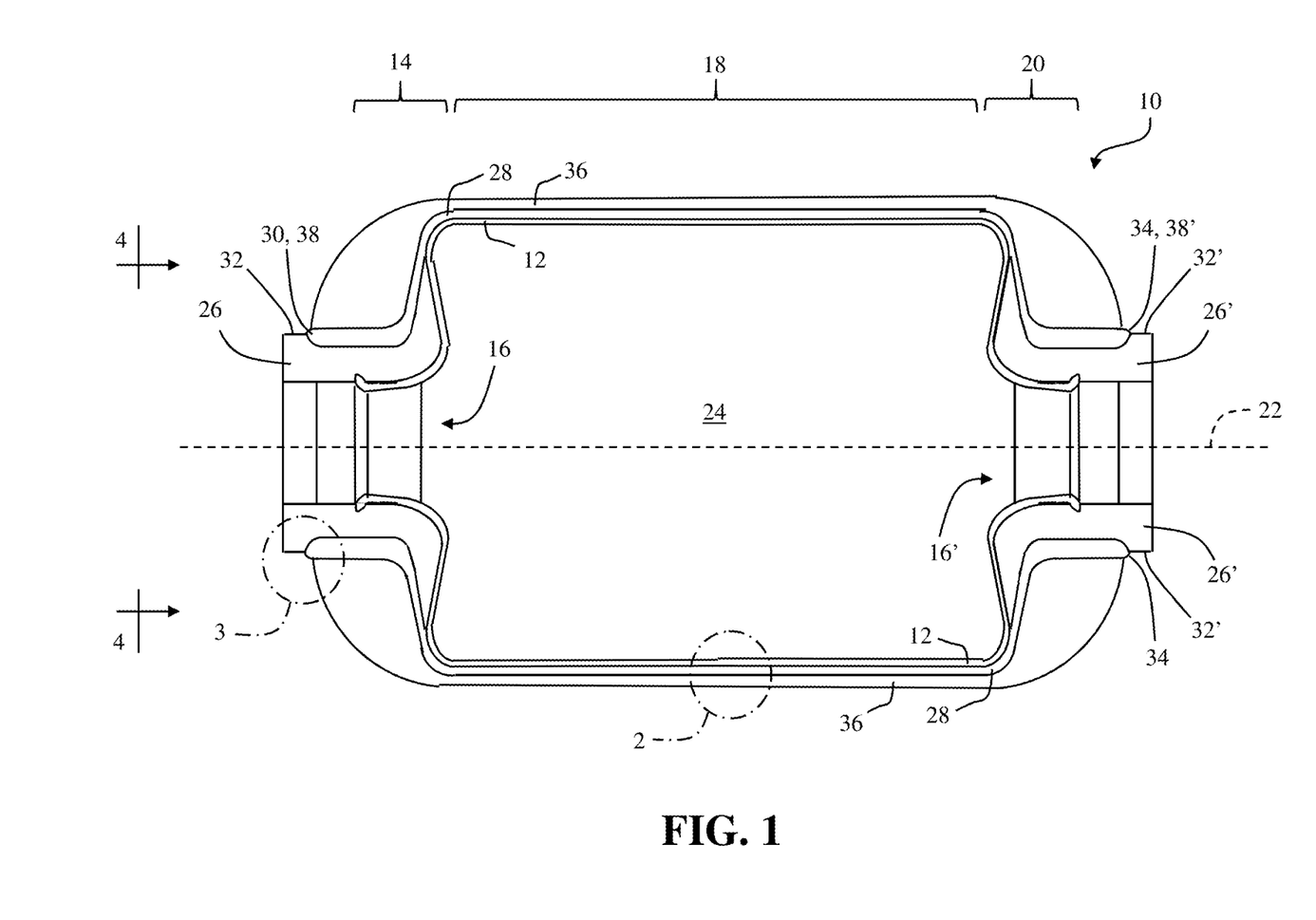
FIG. 1 is a schematic illustration of a storage tank according to various aspects of the current technology.

With reference to FIG. 1, the current technology provides a storage tank 10 for a gas, such as for $H_2(g)$. In particular, FIG. 1 shows a cross-sectional view of the storage tank 10. The storage tank 10 comprises a liner 12 comprising a first end portion 14 defining a port 16, a central body portion 18, and a second end portion 20 that opposes the first end portion 14. More particularly, the liner 12 defines and extends about a longitudinal axis 22 from the port 16 at the first end portion 14, to the central body portion 18, and to the second end portion 20. As shown in FIG. 1, the liner 12 defines a second port 16' at the second end portion 20. It will be appreciated that the second port 16' is optional and the storage tank 10 may be closed at the second end portion 20 in some variations, such that the port 16 is the only port. The liner 12 defines an interior compartment 24, in which the gas is stored. In certain aspects, the liner 12 has a thickness of greater than or equal to about 2 mm and less than or equal to about 10 mm.

The liner 12 comprises a polymer having a density that is greater than or equal to about 900 kg/m$^3$ to less than or equal to about 1200 kg/m$^3$, including densities of about 900 kg/m$^3$, about 950 kg/m$^3$, about 1000 kg/m$^3$, about 1050 kg/m$^3$, about 1100 kg/m$^3$, about 1150 kg/m$^3$, or about 1200 kg/m$^3$. The polymer comprises a polyamide, polyethylene (e.g., high density polyethylene), polyethylene terephthalate, ethylene vinyl alcohol, polytetrafluoroethylene, or combinations thereof, as non-limiting examples.

The storage tank 10 further comprises a boss 26 coupled to the first end portion 14 of the liner 12 at the port 16. In some variations, the boss 26 is coupled and secured to the first end portion 14 of the liner 12 by a press fit with the port 16 with an optional adhesive. In other variations, the port 16 at the first end portion 14 of the liner 12 has an external threading and the boss 26 has an internal threading that is complementary to the external threading, and the boss 26 is coupled to the first end portion 14 of the liner 12 by way of the external threading of the first end portion 14 of the liner 12 and the internal threading of the boss 26. As shown in FIG. 1, the storage tank 10 may also include a second boss 26' coupled to the second end portion 20 of the liner 12 at the second port 16'. However, as discussed above, in some variations the storage tank 10 only includes the boss 26 at the first end portion 14 of the liner 12.

The storage tank 10 further comprises an interlayer or breather layer 28. The interlayer 28 is disposed about the liner 12 and the boss 26, such that the interlayer 28 extends from a first interlayer end 30 at an exposed outer surface 32 of the boss 26 at the first end portion 14 of the liner 12, about the central body portion 18 of the liner 12, and about at least a portion of the second end portion 20 of the liner 12 to a second interlayer end 34 that opposes the first interlayer end 30 at a second exposed outer surface 32' of the second boss 26'. As discussed above, it will be appreciated that in some variations, the storage tank 10 only includes the boss 26 at the first end portion 14 of the liner 12, and the second end portion 20 of the liner is closed, such that there is no second boss 26' and no second interlayer end 34. In certain aspects, the interlayer 28 has a thickness of greater than or equal to about 20 μm and less than or equal to about 2 mm.

In certain aspects, the interlayer 28 is bonded to at least one of the liner 12, the boss 26, or the second boss 26' by an adhesive. Therefore, although not shown in the figure, the storage tank 10 can comprise an adhesive layer disposed between at least one of the liner 12, the boss 26, or the second boss 26' and the interlayer 28. When present, the adhesive is a high viscosity adhesive, such as a fast tack adhesive, a water-based paste, silicone-based adhesives, a cyanoacrylate gel, and combinations thereof, as non-limiting examples.

The interlayer 28 comprises an interconnected web or matrix comprising pores having an average diameter of greater than the diameter of a $H_2$ molecule (about 2.5 Å or 0.25 nm) to less than or equal to about 2 nm, such as a diameter of greater than or equal to about 500 pm to less than or equal to about 2 nm. The interconnected web or matrix of the interlayer 28 has a porosity (i.e., a fraction of the total volume of pores over the total volume of the interlayer 28) of greater than or equal to about 15% to less than or equal to about 85%, including porosities of about 15%, about 20%, about 25%, about 30%, about 35%, about 40%, about 45%, about 50%, about 55%, about 60%, about 65%, about 70%, about 75%, about 80%, or about 85%.

The interconnected web or matrix of the interlayer 28 comprises an interlayer material. As non-limiting examples, the interlayer material comprises carbon, silica, a polymer, a metal-organic framework, or combinations thereof. As non-limiting examples, the carbon can be high surface area activated carbon, porous carbon produced from pyrolyzed polymers, graphitic carbon, carbon nanotubes, fullerene (e.g., $C_{60}$, $C_{20}$, etc.), or combinations thereof. As non-limiting examples, the silica can be silica ($SiO_2$), a zeolite, or a combination thereof. As non-limiting examples, the polymer can be hyper-cross-linked polymers, polymer networks, or a combination thereof. The metal-organic framework (MOF) comprises metal ions or clusters coordinated to organic ligands to form three-dimensional structures and can be Zr(IV) biphenyldicarboxylate (UiO-67), Copper benzene-1,3,5-tricarboxylate (HKUST-1), aluminum terephthalate (MIL-53), 2-methylimidazole zinc salt (ZIF-8), $Zn_4O$ (benzodicarboxylate)$_3$ (MOF-5), or combinations thereof, as non-limiting examples. The interlayer material is derived from a porous powder having a high surface area and capable of absorbing $H_2(g)$.

In some variations, the interlayer 28 further comprises a binder dispersed throughout the interconnected web or matrix. Non-limiting examples of suitable binders include styrene-butadiene rubber, cellulose, polyvinylpyrrolidone, polyvinylidene fluoride, perfluorobutylethylene, perfluorobutyl vinyl ether, trifluoroethylene, hexafluoropropene, hexafluoroisobutylene, pentafluoropropene, polyvinyl alcohol with sulfosuccinic acid, polytetrafluoroethylene, polystyrene polyethylene oxide, a polyamide, or combinations thereof. When the binder is included, the interlayer 28 may be considered "green," "a green interlayer," or "an interlayer in green form." Porosity of the interlayer 28 can be reduced by calendaring the interlayer, in which pressure, with or without heat, is applied to the interlayer 28 to increase its density If a higher porosity is sought, the binder can be combined with an adjunct binder, the adjunct binder being a carbonate, such as polypropylene carbonate (e.g., NB-180 PPC by Novomer Inc.), polyethylene carbonate, poly(cyclohexene propylene) carbonate, butylene carbonate, and combinations thereof as non-limiting examples. These adjunct binders are "sacrificial" and can be sublimated at elevated temperatures to impart added porosity. In some aspects, the interlayer 28 with the adjunct binder removed has a higher porosity and, thus, permeability to $H_2(g)$ relative to the interlayer 28 having the adjunct binder. Also, the above-discussed pore size of the interconnected web or matrix is large enough for $H_2(g)$ permeation, but small enough so that the binder does not seep into the pores.

In certain variations, although the interlayer 28 can include porous carbon produced from pyrolyzed polymers, the interlayer 28 itself is not pyrolyzed.

Referring back to FIG. 1, the storage tank 10 further comprises an outer shell 36. The outer shell 36 covers substantially all of the interlayer 28, except for the first interlayer end 30 and the second interlayer end 34 (when present), so that the first interlayer end 30 and the second interlayer end 34 (when present) are exposed to an external environment, i.e., an environment that is external to the storage tank 10. The first interlayer end 30 and the second interlayer end 34 (when present) that are exposed to the external environment define an interlayer ring 38 disposed about the boss 26 and when the second boss 26' is present, a second interlayer ring 38'. The interlayer rings 38, 38' have a thickness $T_{IR}$ that is greater than or equal to about 0.1 mm to less than or equal to about 2 mm, including thickness of about 0.1 mm, about 0.3 mm, about 0.4 mm, about 0.5 mm, about 0.6 mm, about 0.7 mm, about 0.8 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, or about 2 mm (see FIGS. 3 and 4).

The outer shell 36 comprises a carbon fiber reinforced composite comprising carbon fibers having a tensile strength of greater than or equal to about 700 ksi. The carbon fibers are embedded within a polymer resin, which can be a thermoset resin, such as a phenolic epoxy, or a thermoplastic resin, such as a polyamide. In certain aspects, the outer shell 36 has a thickness of greater than or equal to about 6 mm and less than or equal to about 40 mm.

Figure 2:
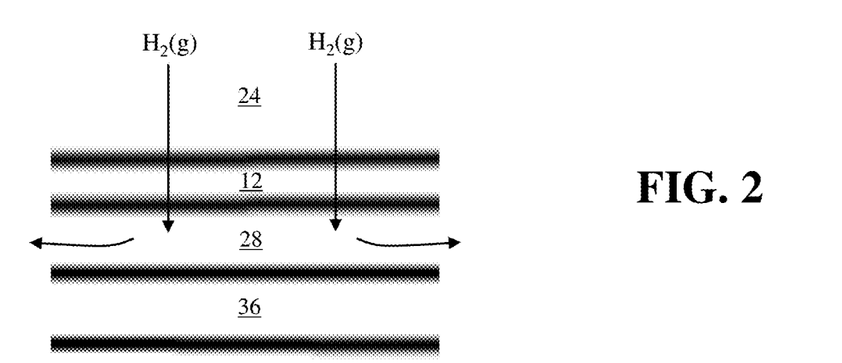
FIG. 2 is a magnified view of a first portion of the storage tank shown in FIG. 1.
Figure 3:
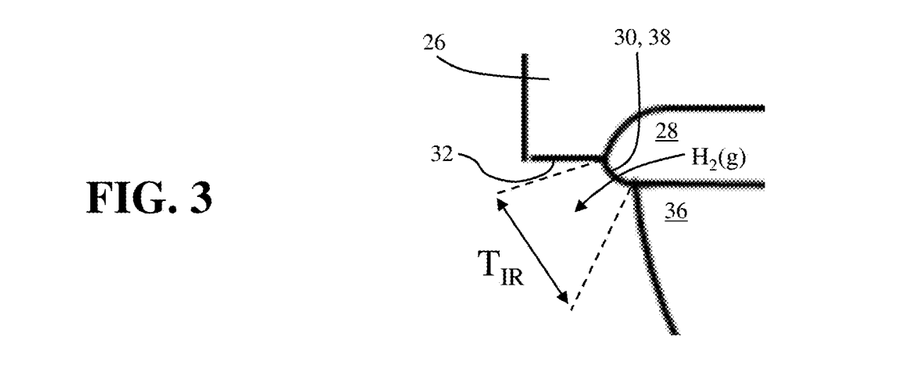
FIG. 3 is a magnified view of a second portion of the storage tank shown in FIG. 1.
Figure 4:
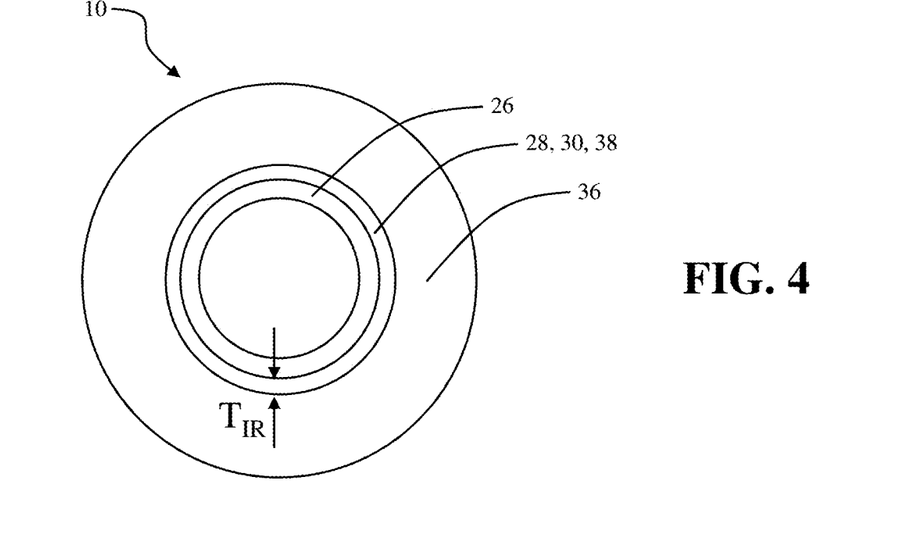
FIG. 4 is a non-cross-sectional view of the storage tank shown in FIG. 1 taken along plane 4.

FIGS. 2 and 3 are magnified images of portions 2, 3 of the storage tank 10 identified in FIG. 1. As can be seen in these images, the storage tank 10 is configured so that when gas diffuses through the liner 12 to the interlayer 28, the gas permeates through the interlayer 28, and the interlayer 28 channels the gas out of the first interlayer end 30 of the interlayer 28 that defines the interlayer ring 38 to the external environment. When the storage tank 10 includes the two bosses 26, 26', the storage tank 10 is configured so that when gas diffuses through the liner 12 to the interlayer 28, gas permeates through the interlayer 28, which channels the gas out of at least one of the first interlayer end 30 or the second interlayer end 34 of the interlayer 28 to the external environment. FIG. 4 is a non-cross-sectional view of the storage tank 10 of FIG. 1 taken along plane 4. Here, the interlayer ring 38 formed from the first interlayer end 30 of the interlayer 28 can be seen between the boss 26 and the outer shell 36.

Figure 5:
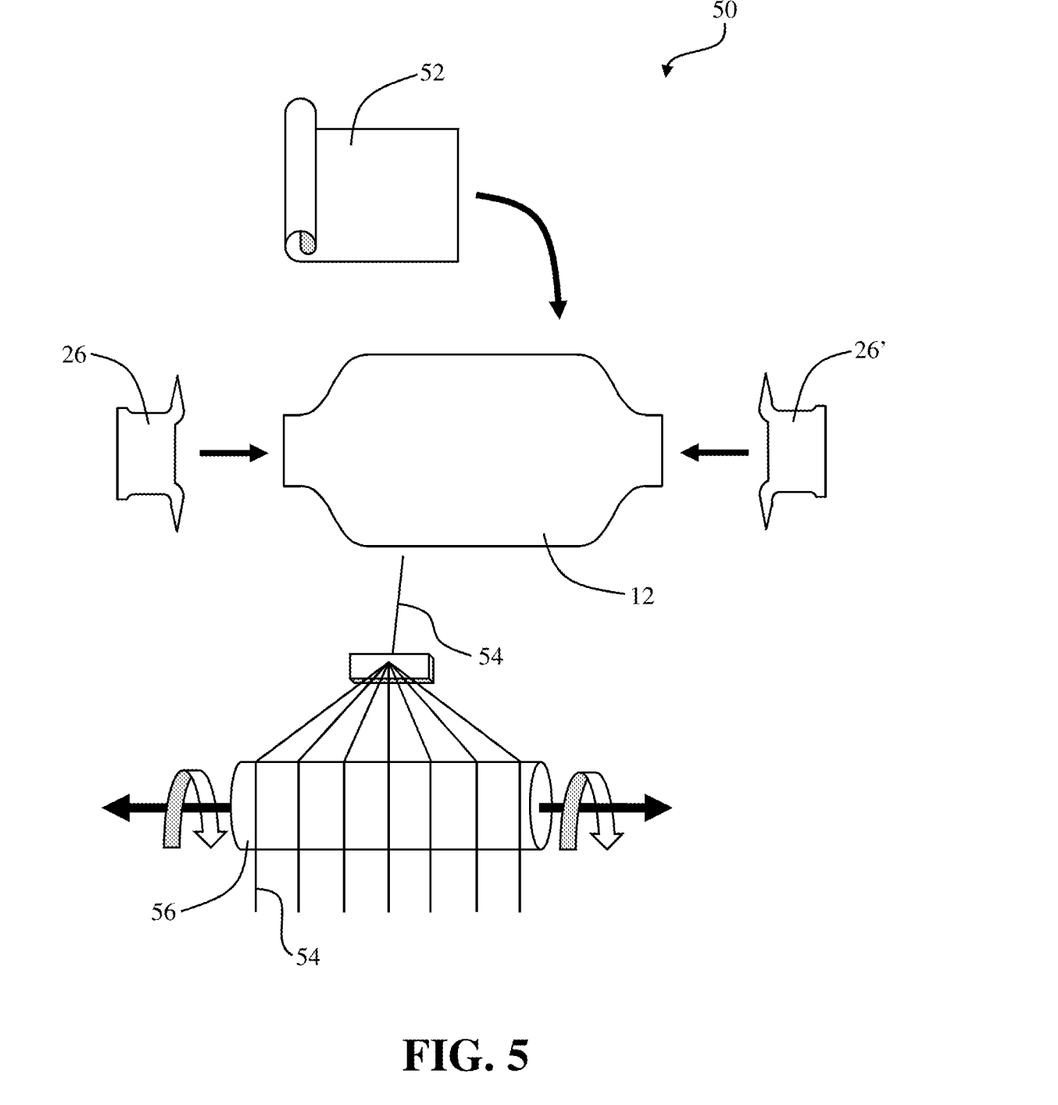
FIG. 5 shows a method of making a storage tank in accordance with various aspects of the current technology.

With reference to FIG. 5, the current technology also provides a method 50 of fabricating the storage tank discussed above. The method comprises providing the liner 12 as described above. The liner 12 can be made as a single monolithic unit by blow molding or rotational or by welding together two halves of the liner 12 formed by injection molding. When halves are welded together to form the liner 12, the weld flash should be removed.

The method 50 also comprises coupling the boss 26 and the second boss 26' (as discussed above) to the liner 12. The coupling can be performed by press-fitting the bosses 26, 26' to the liner, optionally with an adhesive, or by screwing the bosses 26, 26' into the liner.

Next, the method 50 comprises forming the interlayer 28 (as discussed above) onto a portion of the bosses 26, 26' and over the liner 12. The forming the interlayer 28 comprises applying an interlayer material 52 over the liner 12 and over a portion of the bosses 26, 26'. The interlayer material 52 can be in a green form or in a form, in which an adjunct binder has been removed. In either form, the interlayer material 52 is an elastic film or sheet that can be wrapped about the bosses 26, 26' and liner 12 by hand or by machine.

In some variations, the method 50 comprises applying an adhesive, such as a high viscosity adhesive, to at least one of the liner 12, to a portion of the boss 26, or to a portion of the second boss 26', prior to the applying the interlayer material 52.

The interlayer material 52 is made by forming a mixture comprising a precursor powder, a binder, an optional adjunct binder, and a solvent. The mixture comprises the precursor powder at a concentration of greater than or equal to about 70 wt. % to less than or equal to about 95 wt. % and the binder at a concentration of greater than or equal to about 5 wt. % to less than or equal to about 30 wt. %. The precursor powder comprises a carbon powder, a silica powder, a polymer powder, a metal-organic framework powder, or combinations thereof, wherein the carbon, silica, polymer, and metal-organic framework are discussed above. The binder and adjunct binder is also discussed above. Non-limiting examples of the solvent include methoxybenzene (anisole), dichloromethane, tetrahydrofuran, ethyl acetate, diethyl ether, methylene chloride, carbon tetrachloride, chloroform, toluene, benzene, cyclohexane, hexane, pentane, acetone, methylethylketone, N-methyl pyrrolidone, and combinations thereof. The method of making the interlayer material 52 then comprises casting a layer of the mixture onto a substrate. The substrate comprises any material with low enough cohesive forces that the interlayer material 52 can eventually be removed from it. Exemplary substrate materials include polytetrafluoroethylene and glass. The casting is performed by doctor blading, spin casting, pouring, or by any other method known in the art. In some variations, the layer is casted with a predetermined thickness. The method of making the interlayer material 52 then comprises drying the layer and removing at least a portion of the solvent to form the interlayer material 52 (in a green form when the adjunct binder is included). Optionally, the method further comprises calendaring the interlayer material 52 to decrease the porosity or achieve a predetermined thickness. When the adjunct binder is included, the interlayer material 52 can be used in the green form, and optionally heated to remove the adjunct binder after the storage tank is formed, or the interlayer material 52 in green form can be heated to remove the adjunct binder prior to forming the interlayer 28.

After the interlayer material 52 is applied and the interlayer 28 (as discussed above) is formed, the method 50 comprises forming the outer shell 36 (as described above) on the interlayer 28, except for interlayer ends 30, 34 of the interlayer 28 that are in contact with the bosses 26, 26', so that the interlayer ends 30, 34 of the interlayer 28 define the interlayer rings 38, 38' that are exposed to an external environment (as described above). Forming the outer shell 36 is performed by filament winding, in which carbon fibers 54 impregnated with polymer resin (as described above) are pulled by a rotating mandrel 56, combined, and wound around the interlayer 28 and the bosses 26, 26' in one of two processes—wet winding or towpreg winding. In wet winding, the carbon fibers 54 are run through a bath of uncured polymer resin before being wound around the interlayer 28 and the bosses 26, 26'. In towpreg winding, the carbon fibers are pre-impregnated with the uncured polymer resin and directly wound around the interlayer 28 and the bosses 26, 26'. By rotating the interlayer 28 and the bosses 26, 26' and by moving the rotating mandrel 56 laterally, the carbon fibers 54 impregnated with polymer resin are wrapped around the interlayer 28 and the bosses 26, 26', until a desired or predetermined thickness is obtained. The carbon fibers 54 impregnated with the polymer resin are then cured at a temperature of greater than or equal to about 150° C. to less than or equal to about 200° C., including temperatures of about 150° C., 155° C., 160° C., 165° C., 170° C., 175° C., 180° C., 185° C., 190° C., 195° C., and 200° C., for a time period of greater than or equal to about 1 hour to less than or equal to about 24 hours, and then cooled to ambient temperature or room temperature to form the outer shell 36.

Figure 6A:
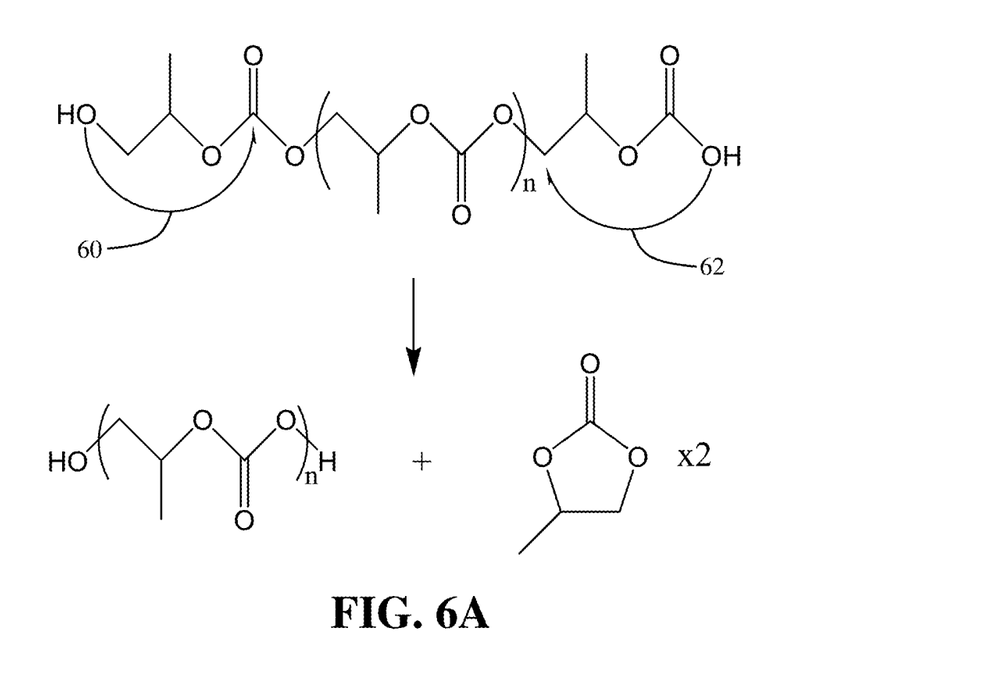
FIG. 6A shows a first decomposition reaction of a polymeric adjunct binder.
Figure 6B:
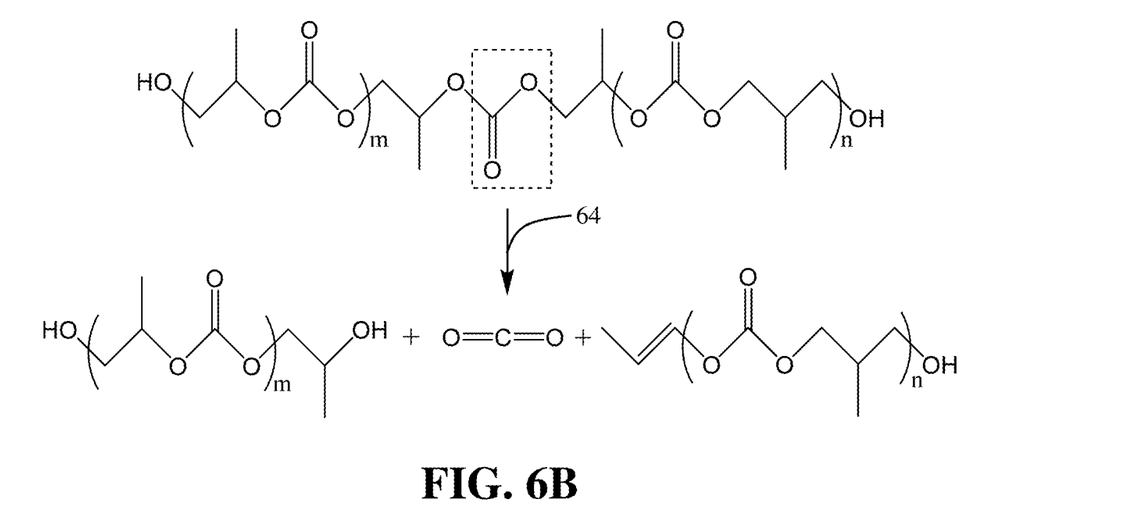
FIG. 6B shows a second decomposition reaction of a polymeric adjunct binder.

When the interlayer 28 includes an adjunct binder (as discussed above) and is in green form, the method optionally includes removing the adjunct binder by heating the storage tank at a temperature greater than or equal to about 90° C. to less than or equal to about 160° C., including temperatures of about 90° C., about 95° C., about 100° C., about 105° C., about 110° C., about 115° C., about 120° C., about 125° C., about 130° C., about 135° C., about 140° C., about 145° C., about 150° C., about 155° C., and about 160° C., to remove at least a portion of the binder from the interlayer in green form and convert it into a form having a relatively higher porosity (and higher $H_2(g)$ permeability). In some aspects, the curing described above is performed at a sufficient temperature to remove the adjunct binder and an additional step is not necessary. The heating decomposes the adjunct binder. Using polypropylene carbonate as an exemplary adjunct binder, FIG. 6A shows a decomposition pathway, in which an alkoxide backbiting mechanism 60 and a carbonate backbiting mechanism 62 split the polypropylene carbonate into two propylene carbonate molecules. As shown in FIG. 6B, a random chain scission mechanism 64 removes carbon dioxide molecules from the polypropylene carbonate. The breakdown products, e.g., propylene carbonate and carbon dioxide, sublime and exit the storage tank through the interlayer rings 38, 38'.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A storage tank for a gas, the storage tank comprising:
   a liner comprising a first end portion, a central body portion, and a second end portion that opposes the first end portion, the liner defining an interior compartment;
   a boss coupled to the first end portion of the liner;
   an interlayer disposed about the liner and the boss, such that the interlayer extends from a first interlayer end at an exposed outer surface of the boss, about the central body portion of the liner, and about at least a portion of the second end portion of the liner to a second interlayer end that opposes the first interlayer end; and
   an outer shell covering substantially all of the interlayer, except for the first interlayer end and the second interlayer end, so that the first interlayer end and the second interlayer end are exposed to an external environment,
   wherein the storage tank is configured so that when gas diffuses through the liner to the interlayer, the interlayer channels the gas out of the first interlayer end of the interlayer to the external environment.

2. The storage tank according to claim 1, wherein the liner comprises a polymer having a density that is greater than or equal to about 900 kg/m$^3$ to less than or equal to about 1200 kg/m$^3$.

3. The storage tank according to claim 2, wherein the polymer comprises a polyamide, polyethylene, ethylene vinyl alcohol, polytetrafluoroethylene, or combinations thereof.

4. The storage tank according to claim 1, wherein the interlayer comprises an interconnected web comprising pores having an average diameter of greater than or equal to about 500 pm to less than or equal to about 2 nm and a porosity of greater than or equal to about 15% to less than or equal to about 85%.

5. The storage tank according to claim 4, wherein the interconnected web comprises an interlayer material comprising carbon, silica, a polymer, a metal-organic framework, or combinations thereof.

6. The storage tank according to claim 5, wherein the interconnected web further comprises a binder.

7. The storage tank according to claim 6, wherein the binder comprises styrene-butadiene rubber, cellulose, polyvinylpyrrolidone, polyvinylidene fluoride, perfluorobutylethylene, perfluorobutyl vinyl ether, trifluoroethylene, hexafluoropropene, hexafluoroisobutylene, pentafluoropropene, polyvinyl alcohol with sulfosuccinic acid, polytetrafluoroethylene, polystyrene polyethylene oxide, a polyamide, polypropylene carbonate, polyethylene carbonate, poly(cyclohexene propylene) carbonate, butylene carbonate, or combinations thereof.

8. The storage tank according to claim 1, wherein the outer shell comprises a carbon fiber reinforced composite.

9. The storage tank according to claim 1, wherein the first interlayer end that is exposed to the external environment defines an interlayer ring disposed about the boss, the interlayer ring having a thickness that is greater than or equal to about 0.1 mm to less than or equal to about 2 mm.

10. The storage tank according to claim 1, further comprising a second boss coupled to the second end portion of the liner, wherein the interlayer extends to the second interlayer end at an exposed outer surface of the second boss and the outer shell does not cover the second interlayer end so that the second interlayer end is exposed to the external environment,
wherein the storage tank is configured so that when gas diffuses through the liner to the interlayer, the interlayer channels the gas out of at least one of the first interlayer end or the second interlayer end of the interlayer to the external environment.

11. A storage tank for a gas, the storage tank comprising:
a liner comprising a polymer and defining an internal compartment;
a boss coupled to the liner;
an interlayer covering a portion of the boss and the liner, the interlayer comprising an interconnected web comprising carbon, silica, a polymer, a metal-organic framework, or combinations thereof and pores having a diameter greater than the diameter of a hydrogen molecule and less than or equal to about 2 nm, and the interlayer being non-pyrolyzed; and
an outer shell comprising a carbon fiber reinforced composite, the outer shell covering the interlayer, except for an interlayer end that is in contact with the boss, so that the interlayer end of the interlayer defines an interlayer ring that is exposed to an external environment,
wherein the storage tank is configured so that when gas diffuses through the liner to the interlayer, the interlayer channels the gas out of the exposed interlayer ring.

12. The storage tank according to claim 11, wherein the interconnected web of the interlayer has a porosity of greater than or equal to about 15% to less than or equal to about 85%.

13. The storage tank according to claim 11, wherein the interlayer further comprises a binder selected from the group consisting of styrene-butadiene rubber, cellulose, polyvinylpyrrolidone, polyvinylidene fluoride, polypropylene carbonate, polyethylene carbonate, poly(cyclohexene propylene) carbonate, butylene carbonate, and combinations thereof.

14. A method of fabricating a storage tank for a gas, the method comprising:
coupling a boss to a liner that comprises a polymer and defines an internal compartment;
applying an interlayer over the liner and over a portion of the boss, the interlayer being non-pyrolyzed and comprising an interconnected web comprising carbon, silica, a polymer, a metal-organic framework, or combinations thereof and pores having a diameter greater than the diameter of a hydrogen molecule and less than or equal to about 2 nm; and
forming an outer shell comprising a carbon fiber reinforced composite on the interlayer, except for an interlayer end that is in contact with the boss, so that the interlayer end defines an interlayer ring that is exposed to an external environment,
wherein the storage tank is configured so that when gas diffuses through the liner to the interlayer, the interlayer channels the gas out of the exposed interlayer ring.

15. The method according to claim 14, wherein the coupling the boss to the liner comprises screwing the boss into the liner by way of threading on an inner surface of the boss and complementary threading on an outer surface of the liner.

16. The method according to claim 14, wherein the interlayer is formed by:
forming a mixture comprising a precursor powder and a binder;
casting a layer of the mixture onto a substrate;
drying the layer to form the interlayer; and
optionally calendaring the interlayer.

17. The method according to claim 16, wherein the mixture comprises the precursor powder at a concentration of greater than or equal to about 70 wt. % to less than or equal to about 95 wt. % and the binder at a concentration of greater than or equal to about 5 wt. % to less than or equal to about 30 wt. %.

18. The method according to claim 16, wherein the precursor powder comprises carbon, silica, a polymer, a metal-organic framework, or combinations thereof and the binder comprises styrene-butadiene rubber, cellulose, polyvinylpyrrolidone, polyvinylidene fluoride, polypropylene carbonate, polyethylene carbonate, poly(cyclohexene propylene) carbonate, butylene carbonate, or combinations thereof.

19. The method according to claim 14, further comprising:
applying an adhesive to the liner and to the portion of the boss prior to the applying the interlayer.

20. The method according to claim 14, wherein the interlayer comprises an adjunct binder and is in a green form, and the method further comprises, after the forming:
heating the storage tank at a temperature greater than or equal to about 90° C. to less than or equal to about 160° C. to remove at least a portion of the adjunct binder from the interlayer in green form to convert the interlayer in green form to a porous interlayer having a relatively higher porosity than the interlayer in green form.

\* \* \* \* \*